Sept. 17, 1968  H. R. AXELROD ETAL  3,401,671
INSULATED SHIPPING CONTAINER FOR LIVE AQUARIUM FISH
Filed May 12, 1966  2 Sheets-Sheet 1

INVENTORS—
Herbert R. Axelrod & Bernard Duke,
BY Richards & Cifelli,
Attorneys—

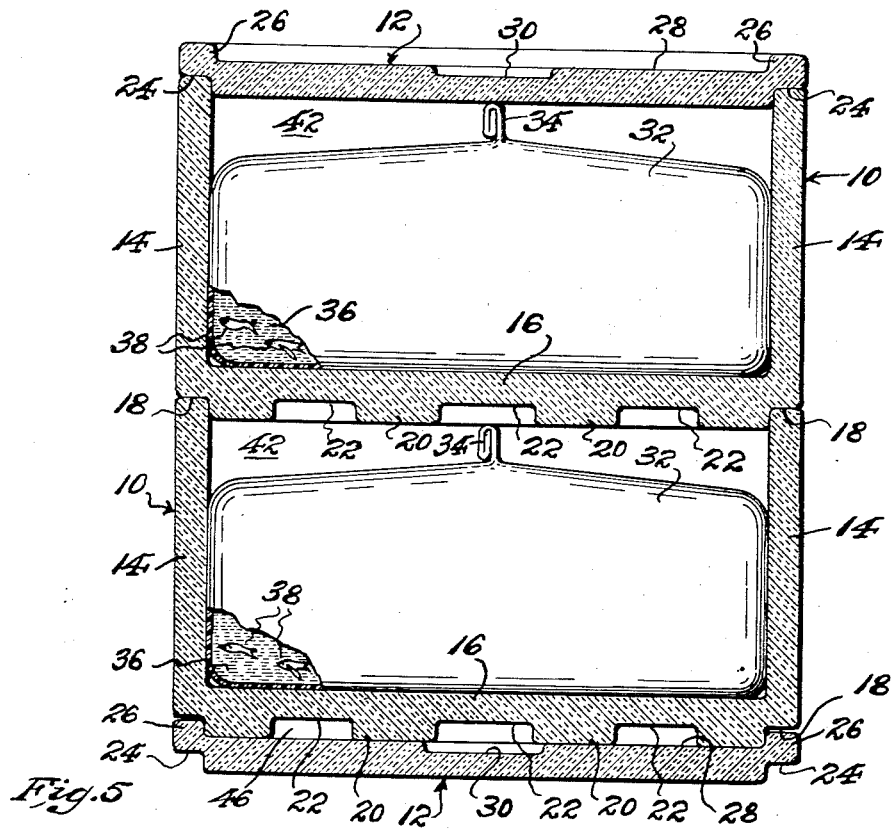
Fig. 5
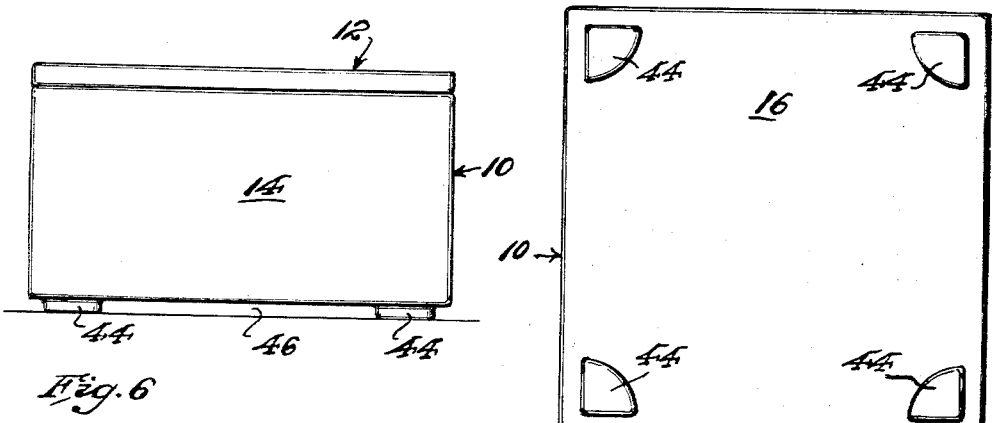
Fig. 6
Fig. 7

United States Patent Office 3,401,671
Patented Sept. 17, 1968

3,401,671
INSULATED SHIPPING CONTAINER FOR
LIVE AQUARIUM FISH
Herbert R. Axelrod, Deal, N.J., and Bernard Duke, Sarasota, Fla., assignors to T.F.H. Publications, Inc., Jersey City, N.J., a corporation of New Jersey
Filed May 12, 1966, Ser. No. 549,619
6 Claims. (Cl. 119—5)

ABSTRACT OF THE DISCLOSURE

Thermally insulated shipping containers for plastic bags of water holding live fish, having a hollow body and a top, each molded in one piece of cellular plastic such as Styrofoam, are provided with insulating means to support the bottom wall of the body in spaced relationship to a surface on which the container rests. The bottom of the body of each box is adapted to nest in the open top of another box to close it when the boxes are stacked; the cover of the lower box being placed beneath the stack for added insulation.

---

Figure 1:
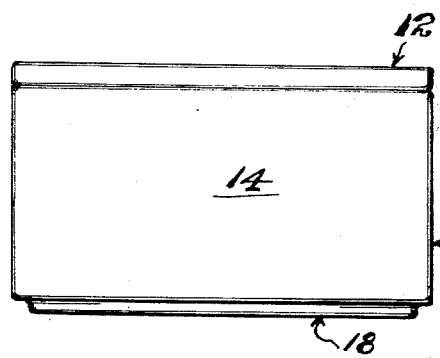

The present invention relates to insulated shipping containers, and, more particularly, to shipping containers for small, live, aquarium fishes.

The wide-spread interest in the keeping and breeding of fish in aquariums in the home and elsewhere has increased at a very rapid rate in recent years to the point where the market for tropical, exotic and other suitable fish for this purpose has become very large. For many years tropical and other small fish were collected in their native waters and placed in large cans of water for transportation. While this method was and is suitable for transporting fish short distances, it has many disadvantages for long distance shipment, not only due to the weight of the cans of water and fish which entails excessive shipping costs, but due to the difficulty of keeping fish alive in such cans for an extended period of time. In more recent years live, small, aquarium fish have been placed in a plastic bag closed at the top by knotting or sealing by suitable means, and enclosed in a fiber, pasteboard, or wooden shipping box or tin can. A volume of air or preferably oxygen trapped above the surface of the water in the plastic bag serves to furnish enough oxygen to keep the fish alive for several days during shipment. For additional insulation against temperature change, the shipping boxes have been stuffed with torn newspaper or other inert material around the enclosed plastic bag. The use of water and oxygen-filled plastic bags for the packaging of live fish is described and claimed in U.S. Patent 2,949,882, issued Aug. 23, 1960. Although this development constituted a significant advance in the art of transporting live fish, several serious problems have remained to be solved.

Exotic, aquarium fish are collected or bred in many widely separated parts of the world, particularly in the Orient and South America, and fish farms located in Florida and other places having warm climates. However, not all of these fish are native to the tropics, and even some of the tropical species do not come from particularly warm water. The vast majority of these fish, however, are found in waters having a temperature between about 50 and 85° F. as the outside limits, and by far the greatest number are comfortable in water between 70 and 80° F. While most species can tolerate a water temperature range of about 10° F. and can usually withstand a 5° F. change in water temperature over a 24 hour period, for example, a change of several degrees within a few hours time may bring on one of several fish diseases, including the "shakers" or "shimmies," Ichthyophthirius ("ick"), fungus or general decline, often resulting in death.

It is essential, therefore, to prevent rapid changes in water temperature during the shipment of live, aquarium fish. While this fact has been generally known, only makeshift attempts to solve the problem have been made, such as stuffing torn newspapers or other particulate insulating material around the fish-oxygen-and-water-filled plastic bag in a fiber container, for example. This practice has not proven satisfactory, since the particulate material may be unevenly packed initially or may shift in transit, exposing the plastic bag to the cold atmosphere in the freight compartment of the aircraft, truck or train transporting the containers. For this reason it has previously involved substantial economic risk to ship rare or valuable aquarium fish under conditions where they might be exposed to temperatures below 70° F. for any period of time, especially where there is any likelihood of unexpected delays enroute, as is the case with air transportation in particular.

Figure 3:
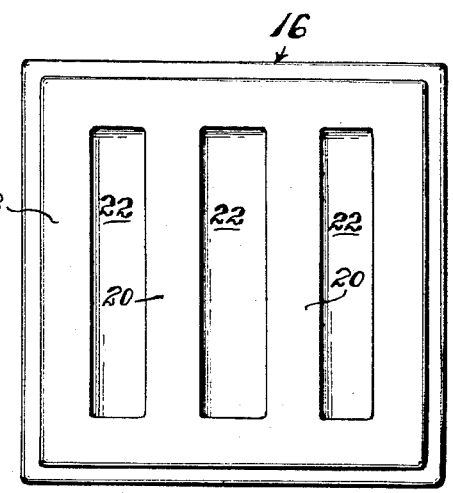
Figure 2:
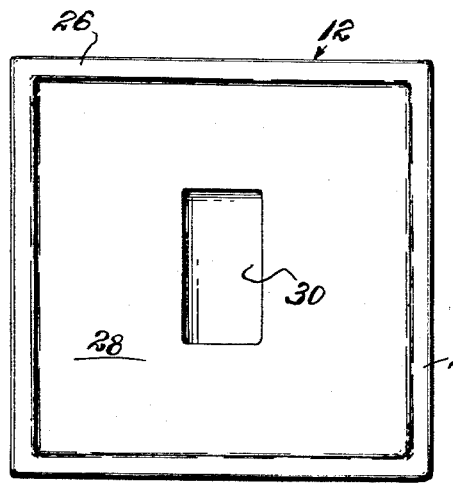
Figure 4:
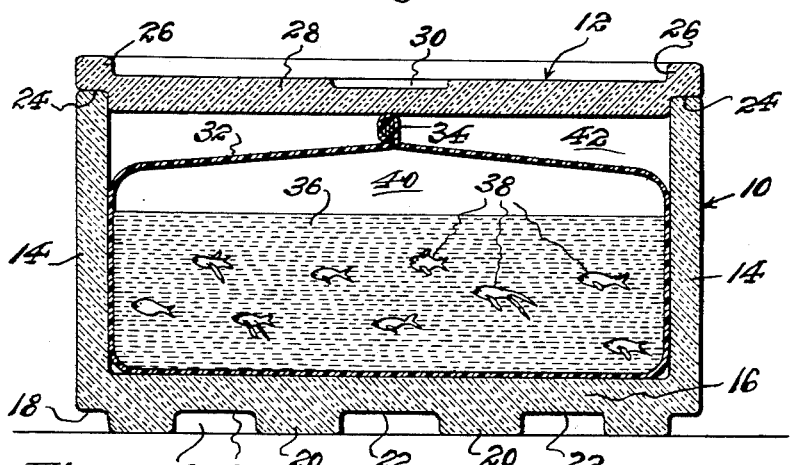

It is apparent, therefore, that a need has existed for many years for an inexpensive, dependable shipping container capable of providing adequate protection for live, aquarium fish under varying conditions in transit. This need has now been filled by the shipping containers of the present invention which will be described in detail in conjunction with the accompanying drawings wherein:

FIG. 1 is a side elevational view of a shipping container of the present invention in closed condition;
FIG. 2 is a top plan view of the closed container;
FIG. 3 is a bottom plan view of the container;
FIG. 4 is a vertical longitudinal sectional view of the closed container, enclosing a plastic bag containing water and live, aquarium fish;
FIG. 5 is a view similiar to FIG. 4, but showing a plurality of containers in stacked nesting condition;
FIG. 6 is a side elevational view of another embodiment of the invention in which the container is provided with spaced corner legs;
FIG. 7 is a bottom plan view of the modified structure of FIG. 6.

Like reference numerals are employed to designate like parts in the several figures of the drawings.

Referring to the drawings, a typical shipping container of the present invention comprises a body 10 and a cover 12 composed of any suitable thermal insulating material of sufficient mechanical strength. The body 10 may take any suitable configuration, but is preferably rectangular or square, as shown in the drawings, to facilitate packing in the freight compartment of an air, land or sea carrier. The body 10 of the illustrated container has four side walls 14 and an integral bottom wall 16. Such a body is suitably made by molding in one piece from Styrofoam to produce a light weight but rugged container having walls about one inch thick. The wall thickness may be varied as desired, of course, and is selected having in mind the structural strength and insulating properties of the material employed.

The bottom wall 16 of the container is provided with a grid 18 made up lands 20 and channels 22 or equivalent relatively raised and depressed surfaces. The raised surfaces or lands 20 serve to support the bottom wall 16 of the container in spaced relationship to the surface on which the container is resting. In this way conduction of heat from the container and its contents to the floor of the freight compartment is minimized. The channels 22 adjacent the lands 20 of the grid 18 also provide an insulating air blanket between the bottom wall 16 of the container and the cold floor of the freight compartment.

The cover 12 of the illustrated shipping container is also molded in one piece and is provided with an undercut portion 24 along its edges on the under side of the cover. This undercut portion 24 is suitably dimensioned to adapt the cover to fit into and completely close the opening of the body 10; the edges of the cover being supported by the upper edges of the side walls 14 of said body. A flange 26 extends along the edges of and is raised above the upper surface 28 of the cover. A depression 30 may be provided in the upper surface 28 of the cover to accommodate a name and address plate and for other reasons noted below.

As best shown in FIG. 4, when in use the shipping container encloses a plastic bag 32, closed and sealed by suitable means as at 34, and containing water 36, live, aquarium fish 38, and air, oxygen or other life supporting gas 40 above the surface of the water in the bag. This is generally a volume of air 42 outside of the bag 32 but within the container, which also aids in insulating the contents of the bag 32.

As will be seen from FIG. 5, the stucture of the new shipping containers provides added insulating protection when a plurality of the containers are stacked in nesting condition. When this is done the cover 12 of one of the containers is placed underside down on the floor of the freight compartment to act as added insulation for the stack of containers. The coverless shipping container is then placed on top of the cover 12 with its grid 18 nesting within the raised flanges 26 of the upper side of the cover as shown in FIG. 5. The top of the open container is then closed by nesting the bottom of a second container therein; the grid 18 being so dimensioned as to completely close the open top of the container. One or more additional containers may in turn be nested in the top of the second container in the stack.

As noted above, the grid 18 may be of any suitable design which serves to raise the bottom wall of the container out of contact with the floor of the freight compartment to reduce contact of the container therewith and to provide a blanket of air between the floor and the bottom wall of the container.

FIGS. 6 and 7, show another embodiment of the invention consisting of a shipping container provided with legs 44 in place of the grid 18. The legs 44 are suitably spaced from each of the four corners of the bottom wall 16 of the container to support the container and, when desired, to nest in the cover or open top of another container in the same manner as grid 18.

The shipping containers of the present invention have been found to be highly effective in insulating the contents against changes in temperature, particularly when stacked as shown in FIG. 5. For example, the new shipping containers, which serve to space the plastic bag full of fish and water further from the floor of the freight compartment, have been found to markedly reduce the heat loss from the water and thus provide substantially increased safety for the fish. To be more specific, it has been observed that water in a plastic bag in a fiber or pasteboard shipping container of the prior art drops from 75° F. to about 70° F. when exposed to air at 40° F. for 12 hours. When water at 75° F. was placed in a plastic bag in one of the containers of the present invention and exposed to air at 40° F. under identical conditions, the water temperature did not drop to 70° F for over 24 hours. In other words the new containers afford at least twice the protection provided by those of the prior art. Even greater protection is provided by the new containers when at least two of them are stacked together as shown in FIG. 5, since it has been observed that more than 30 hours were required to produce a 5° F. drop in water temperature under the conditions set out above. In view of this excellent protection it will be apparent to those skilled in the art that live, tropical fish suspended in 70–80° F. water in plastic bags in the new shipping containers may safely be shipped by air, truck or other transportation over long distances, even during cold weather, without risk of loss due to chilling of the fish.

The foregoing illustrates the practice of this invention, which, however, is not to be limited thereby, but is to be construed as broadly as permissible in view of the prior art and limited solely by the appended claims.

We claim:
1. A thermally insulated shipping container comprising a hollow plastic walled body molded in one piece of rigid cellular plastic having closed side and bottom walls and an opening in the top thereof, and a cover molded in one piece of rigid cellular plastic adapted to completely close said opening, the bottom wall of said body being of a thickness of at least twice that of other body walls and having spaced channel portions providing trapped spaced air thermal insulating means and defining thermal insulating means to support said bottom wall in spaced relationship to a surface upon which said shipping container rests, thereby providing an insulating air space between a substantial portion of said bottom wall and said surface, said cover having peripheral flange means to receive the bottom support means of another one of said shipping containers in nesting relationship, the opening in the top of said hollow body being contoured to receive the botttom of another of said shipping containers in nesting relation to close said opening without substantially reducing the capacity of said body, said body and cover providing substantial thermal insulation for the contents of said container.

2. A shipping container according to claim 1, in which the plastic is Styrofoam.

3. A shipping container according to claim 1, wherein the support means is a grid of lands and channels.

4. A shipping container according to claim 1, containing a flexible plastic bag containing live fish, water and a life-supporting atmosphere.

5. A stack comprising at least two shipping containers according to claim 1, the cover of one of said containers being placed on the bottom of the stack to receive the bottom of one of the containers in nesting relationship thereabove, the bottom of another shipping container being nested in and completely closing the opening in the top of the lowermost container in the stack, and a cover completely closing the top of the uppermost container in said stack.

6. A stack of shipping containers according to claim 5, wherein the containers are composed of Styrofoam and contain live fish suspended in water in plastic bags.

References Cited

UNITED STATES PATENTS

| | | | |
|---|---|---|---|
| 2,149,412 | 3/1939 | Bangs | 62—60 |
| 2,412,325 | 10/1946 | Devine et al. | 220—23.83 |
| 2,680,424 | 6/1954 | Brown | 119—3 |
| 2,763,239 | 9/1956 | Rendall | 119—5 |
| 2,989,856 | 6/1961 | Telkes | 62—371 |
| 3,013,492 | 12/1961 | Sexton | 220—23.83 X |
| 3,194,211 | 7/1965 | Stanek | 119—3 |
| 3,236,206 | 2/1066 | Willinger | 119—3 |
| 3,265,254 | 8/1966 | Carter et al. | 220—23.83 |

ALDRICH F. MEDBERY, *Primary Examiner.*